United States Patent
Jun (10) Patent No.: US 8,260,843 B2
(45) Date of Patent: Sep. 4, 2012

(54) APPARATUS AND METHOD FOR PROVIDING REMOTE USER INTERFACE

(75) Inventor: Goo Jun, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1101 days.

(21) Appl. No.: 11/516,621

(22) Filed: Sep. 7, 2006

(65) Prior Publication Data

US 2007/0073730 A1    Mar. 29, 2007

(30) Foreign Application Priority Data

Sep. 23, 2005  (KR) .................. 10-2005-0088926

(51) Int. Cl.
G06F 15/16    (2006.01)
(52) U.S. Cl. ....................... 709/203; 345/619
(58) Field of Classification Search .............. 709/203, 709/219, 230, 231; 345/738, 762, 619; 715/273, 715/719, 738, 835; 128/899; 719/328; 705/14; 700/83
See application file for complete search history.

(56) References Cited

U.S. PATENT DOCUMENTS

| | | | |
|---|---|---|---|
| 6,104,334 A | 8/2000 | Allport | |
| 6,573,907 B1 * | 6/2003 | Madrane | 715/719 |
| 7,117,504 B2 * | 10/2006 | Smith et al. | 719/328 |
| 7,254,786 B2 * | 8/2007 | Henriquez | 715/835 |
| 7,464,333 B2 * | 12/2008 | Yamamoto | 715/273 |
| 7,502,838 B2 * | 3/2009 | Franco et al. | 709/219 |
| 2002/0002039 A1 | 1/2002 | Qureshey et al. | |
| 2002/0032701 A1 | 3/2002 | Gao et al. | |
| 2002/0129096 A1 * | 9/2002 | Mansour et al. | 709/203 |
| 2003/0093164 A1 * | 5/2003 | Ebert et al. | 700/83 |
| 2004/0056894 A1 * | 3/2004 | Zaika et al. | 345/762 |
| 2004/0125130 A1 * | 7/2004 | Flamini et al. | 345/738 |
| 2004/0249709 A1 * | 12/2004 | Donovan et al. | 705/14 |
| 2005/0061336 A1 * | 3/2005 | Goetz et al. | 128/899 |
| 2006/0174021 A1 * | 8/2006 | Osborne et al. | 709/230 |
| 2006/0174026 A1 * | 8/2006 | Robinson et al. | 709/231 |
| 2006/0256130 A1 * | 11/2006 | Gonzalez | 345/619 |

(Continued)

FOREIGN PATENT DOCUMENTS

EP    1 345 357 A1    9/2003

(Continued)

OTHER PUBLICATIONS

Communication dated Jun. 15, 2011 from the State Intellectual Property Office of P.R. China in counterpart Chinese application No. 200680035008.5.

*Primary Examiner* — Dustin Nguyen
(74) *Attorney, Agent, or Firm* — Sughrue Mion, PLLC (57) ABSTRACT

An apparatus and method for providing an image-based remote user interface (UI) using a web browser are provided. A server includes an user interface (UI) application which provides a dynamic image; a server communication module which, if the dynamic image is updated, transmits an image update event for the updated dynamic image; and a hypertext transfer protocol (HTTP) server which receives a request corresponding to the image update event and transmits the updated dynamic image in response to the received request. The method includes if an image in a remote user interface (UI) is updated, transmitting an image update event for the updated image; receiving a request corresponding to the image update event; and transmitting the updated image in response to the received request.

26 Claims, 5 Drawing Sheets

U.S. PATENT DOCUMENTS

2011/0041067 A1 * 2/2011 Olson et al. .................. 715/738

FOREIGN PATENT DOCUMENTS

| | | |
|---|---|---|
| EP | 1345357 A1 | 9/2003 |
| JP | 2000-20423 A | 1/2000 |
| JP | 2001-101131 A | 4/2001 |
| JP | 2003-085074 A | 3/2003 |
| JP | 2003-122694 A | 4/2003 |
| KR | 10-2004-0072445 A | 8/2004 |
| KR | 1020050039868 A | 4/2005 |
| KR | 1020060044747 A | 5/2006 |
| KR | 1020060053169 A | 5/2006 |
| WO | WO 03/009131 A2 | 1/2003 |
| WO | WO 03/024053 A2 | 3/2003 |
| WO | 03/052626 A1 | 6/2003 |
| WO | 2004021106 A2 | 3/2004 |

* cited by examiner

APPARATUS AND METHOD FOR PROVIDING REMOTE USER INTERFACE

CROSS-REFERENCE TO RELATED APPLICATION

This application claims priority from Korean Patent Application No. 10-2005-0088926 filed on Sep. 23, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to providing a remote user interface (UI), and more particularly, to providing an image-based remote UI using a web browser.

2. Description of the Related Art

In general, when a device A receives a user interface (UI) provided by a device B through a wired or wireless network and provides the received UI to a user, the UI is a remote UI in view of the device A. An example of such a remote UI is a home network. That is to say, in a home network including appliances such as a digital television (TV), a refrigerator, a set-top box, an audio system, and the like, the user can control the appliances through the digital TV. It is convenient for the user to use UIs suitable for the appliances to be controlled.

To this end, each appliance provides a UI which can be displayed on the screen of the digital TV, and the user can control the appliances using their respective UIs displayed on the screen, i.e., the remote UI.

To provide the remote UI, a hypertext markup language (HTML) or a dynamic image update may be used.

Figure 1:
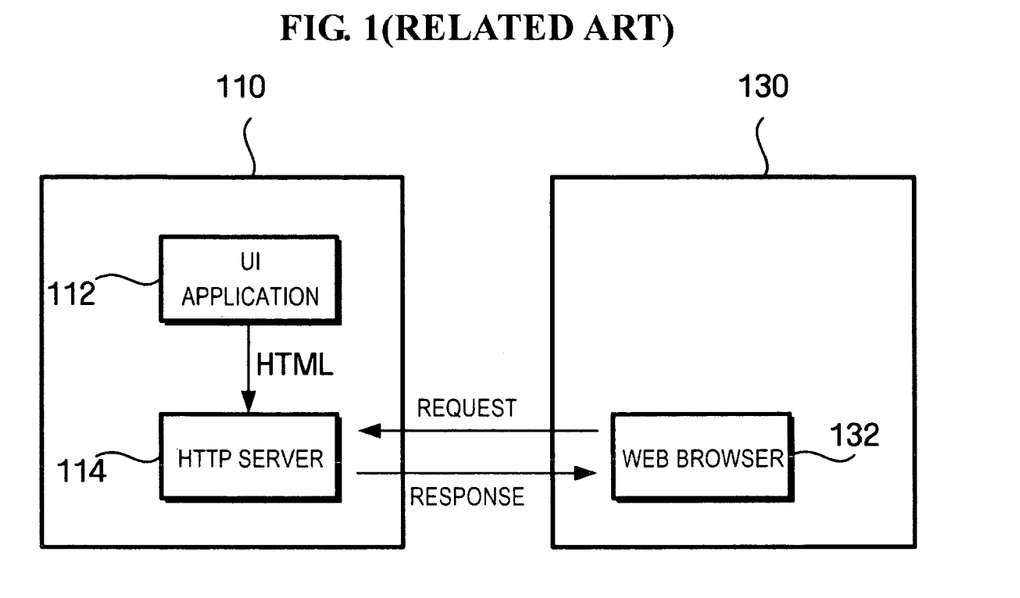
FIG. 1 illustrates a related art system for providing a remote user interface (UI) using hypertext markup language (HTML)

FIG. 1 illustrates a system for providing a remote UI using hypertext markup language (HTML) according to a related art.

Referring to FIG. 1, a related art HTML-based remote UI system includes a remote UI server 110 and a remote UI client 130.

The remote UI server 110 includes a UI application 112 and a hypertext transfer protocol (HTTP) server 114. The remote UI client 130 includes a web browser 132.

The remote UI server 110 includes HTML data to be displayed and the HTML data may contain characters and various images.

Before an HTML page of the remote UI server 110 is displayed using the web browser 132, the web browser 132 transmits a request for an HTML page (HTML request) to the remote UI server 110 using a uniform resource locator (URL).

When the remote UI server 110 receives an HTTP request from the remote UI client 130 the remote UI server 110 transmits an initial HTML file stored in the remote UI server 110 or dynamically generated by the UI application 112 through an HTTP response to the web browser 132 of the remote UI client 130.

The web browser 132 analyzes the received initial HTML file and displays the HTML file on the screen of the remote UI client 130.

Thus, the UIs of appliances connected to the home network can be displayed though the use of the HTML file. For example, when a set-top box has an electronic program guide (EPG) screen in the form of an HTML file, an index.html file that allows selection of an EPG menu is displayed through a web browser of the digital TV. Once the user selects the EPG menu using a remote controller, an EPG.html file linked to the index.html file is retrieved and an EPG made of HTML is displayed to the user. Thus, in this example, the set-top box corresponds to the remote UI server 110 and the digital TV corresponds to the remote UI client 130.

Figure 2:
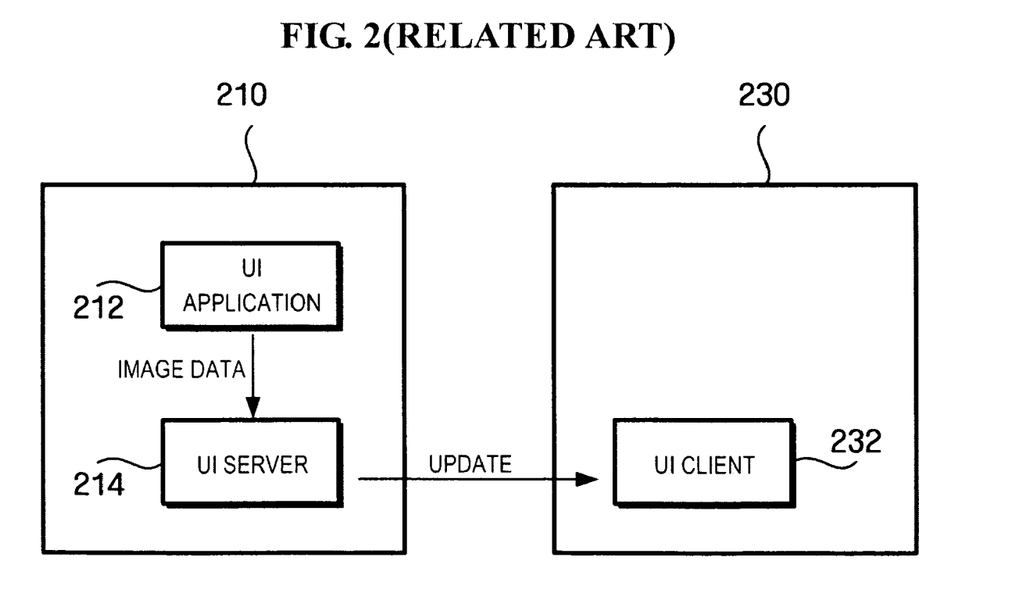
FIG. 2 illustrates a related art system for providing a remote UI using an image update.

FIG. 2 illustrates a system for providing a remote UI using a dynamic image update according to a related art.

Referring to FIG. 2, a related art remote UI system includes a remote UI server 210 and a remote UI client 230.

The remote UI server 210 includes a UI application 212 and a UI server 214. The remote UI client 230 includes a UI client 232.

The UI server 214 and the UI client 232 communicate with each other through a mutually agreed protocol.

When a portion of a UI screen has to be changed, the UI application 212 of the remote UI server 210 transmits an image of the portion that has to be changed to the UI client 232 of the remote UI client 230 through the UI server 214 in the form of a JPG or a bitmap. Alternatively, other similar image formats may be used. At this time, coordinates and the area of the image to be displayed are also transmitted. In other words, a message indicating that a 100×200 image is to be displayed at coordinates (150, 100) and a 100×200 image in the form of a JPG may be transmitted.

When a remote UI is displayed using HTML as in FIG. 1, a user's response is made in an HTML page and a screen including text information can be transmitted with only a small amount of data. Thus, only a small portion of the capacity of the network is occupied and ease in adapting the remote UI to a server on the Internet is promoted. However, it is not easy to display a UI in which the entire screen or a portion thereof is dynamically changed or to directly reflect a change in the state of the server in a client and display the change on the screen.

When an image is dynamically updated as in FIG. 2, a dynamically changing UI can be directly updated in the client by the server, which is useful for dynamic UI display. However, there is a difficulty in adapting the UI to the server on the Internet.

In addition, for example, when appliances using HTML or the dynamic image update exist in the home network, a UI compatibility problem occurs between the appliances.

SUMMARY OF THE INVENTION

The present invention provides a system in which a remote UI client having embedded therein a web browser capable of receiving, from another device or an Internet server, UI data and of displaying the received UI data displays data of a remote UI server that provides a dynamically updated image.

According to an aspect of the present invention, there is provided a server for providing a remote UI including a UI application which provides a dynamic image; a server communication module which, if the dynamic image is updated, transmits an image update event for the updated dynamic image; and a hypertext transfer protocol (HTTP) server which receives a request corresponding to the image update event and transmits the updated dynamic image in response to the received request. According to another aspect of the present invention, there is provided a remote UI client including a browser module which displays a remote UI; and a client communication module which is informed of an occurrence of an image update event in which an image in the remote UI is updated, and which informs the browser module of the occurrence of the image update event, wherein the browser module transmits a request for the updated image according to the occurrence of the image update event and displays the updated image on the remote UI. According to still another aspect of the present invention, there is provided a remote UI proxy server including a control module which receives an updated image of a remote UI; a relay communication module which informs a client that displays the remote UI of an occurrence of an image update event for the updated image; and an HTTP server which receives a request corresponding to the image update event and transmits the updated image in response to the received request.

According to a further aspect of the present invention, there is provided a method for providing a remote UI, the method including if an image in a remote UI is updated, transmitting an image update event for the updated image; receiving a request corresponding to the image update event; and transmitting the updated image in response to the received request.

According to yet another aspect of the present invention, there is provided a method for providing a remote UI, the method including displaying a remote UI; being informed of an occurrence of an image update event; transmitting a request for an updated image; and receiving the updated image and displaying the updated image.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE PRESENT INVENTION

The present invention will now be described more fully with reference to the accompanying drawings, in which exemplary embodiments of this invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 3:
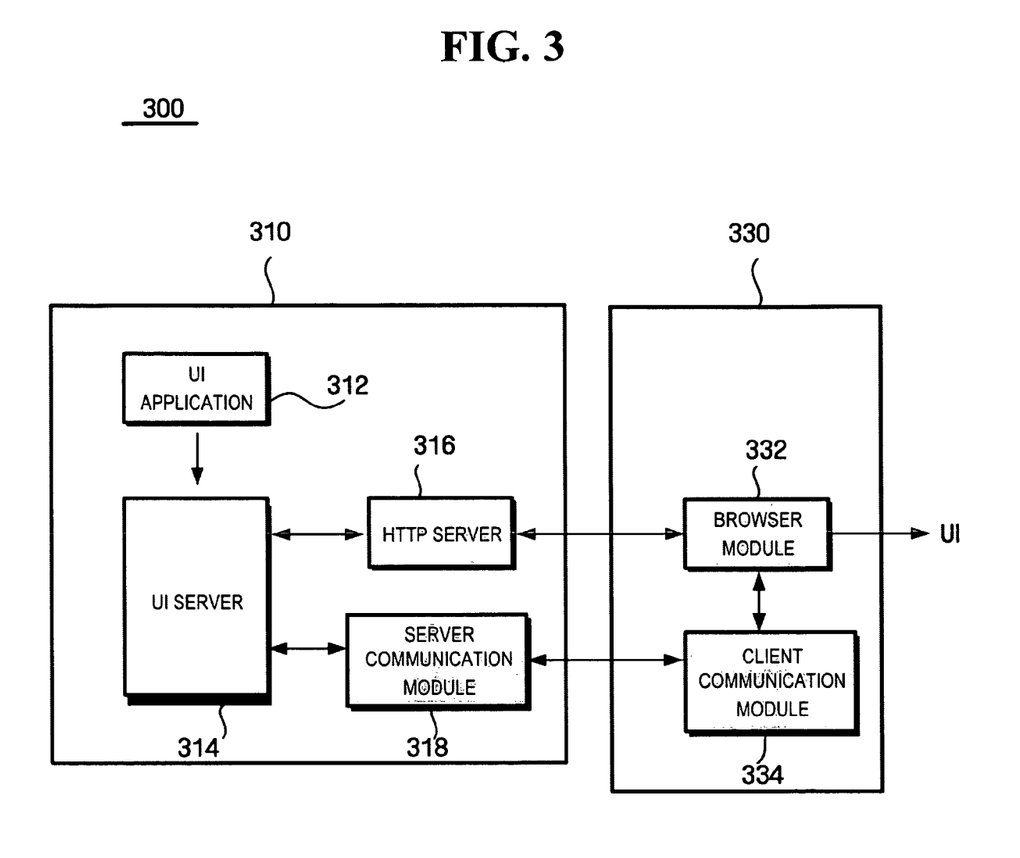
FIG. 3 illustrates a system for providing a remote UI according to an exemplary embodiment of the present invention.

FIG. 3 illustrates a system for providing a remote UI according to an exemplary embodiment of the present invention.

Referring to FIG. 3, a system 300 for providing a remote UI includes a remote UI server 310 and a remote UI client 330.

The remote UI server 310 includes a UI application 312, a UI server 314, a hypertext transfer protocol (HTTP) server 316, and a server communication module 318. The remote UI client 330 includes a browser module 332 and a client communication module 334.

The term "module", as used herein, means, but is not limited to, a software or hardware component, such as a Field Programmable Gate Array (FPGA) or Application Specific Integrated Circuit (ASIC) or other such component, which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The UI application 312 generates a UI to be provided to a user and the HTTP server 316 communicates with a client having a web browser. The server communication module 318 communicates with the remote UI client 330 to provide a dynamic image updated by the UI application 312 to the user.

The UI server 314 controls the UI application 312, the HTTP server 316, and the server communication module 318.

The browser module 332 communicates with the HTTP server 316 or a web server providing a hypertext markup language (HTML) file and provides the UI to the user through a browser. The client communication module 334 communicates with the server communication module 318 to provide the dynamically updated image to the user.

Hereinafter, an operation between the remote UI server 310 and the remote UI client 330 will be described in detail with reference to FIGS. 4 and 5.

Figure 4:
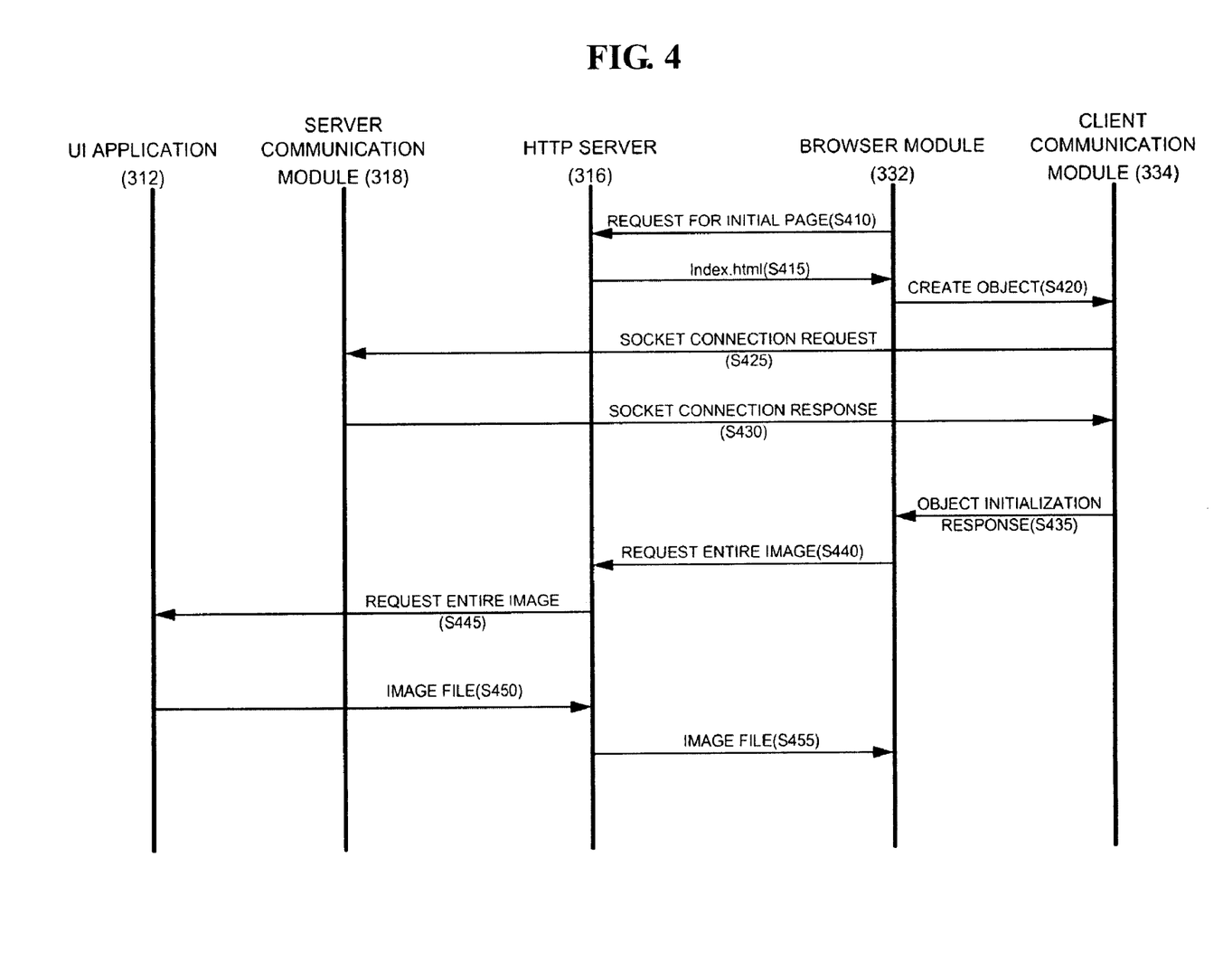
FIG. 4 is a flowchart illustrating a method for providing an initial image to a remote UI according to an exemplary embodiment of the present invention.

FIG. 4 is a flowchart illustrating a method for providing an initial image to a remote UI according to an exemplary embodiment of the present invention.

Once the remote UI server 310 and the remote UI client 330 are connected, the browser module 332 of the remote UI client 330 transmits a request for an initial page to the HTTP server 316 in operation S410. Here, by way of example, the name of the initial page is "index.html".

The HTTP sever 316 transmits the "index.html" file to the browser module 332 in response to the request in operation S415.

The browser module 332 analyzes contents of the 'index.html' file and calls an object, i.e., transmits a create object request to the client communication module 334 to start initialization such as securing a communication channel in operation S420.

The client communication module 334 performs an operation to secure a communication channel with the server communication module 318 of the remote UI server 310. As an example of the operation, if the client communication module 334 transmits a socket connection request to the server communication module 318, like in TCP communication, in operation S425, the server communication module 318 responds with a socket connection response in operation S430, thereby securing a communication channel. For example, the client communication module 334 can connect to a designated TCP port (e.g., the TCP port may be expressed as '192.168.0.3:9001') of the remote UI server 310 to secure a communication channel.

The client communication module 334 then transmits an object initialization response to the browser module 332 in operation S435.

The browser module 332 executes a text body of the 'index.html' file and transmits a request for an image file corresponding to an image for the screen to the HTTP server 316 in operation S440. The image may be for the entire screen. Here, by way of example, the name of the image file corresponding to the entire screen is "whole.jpg".

The HTTP server 316 transmits a request for the "whole.jpg" file to the UI application 312 in response to the request from the browser module 332 in operation S445 and the UI application 312 provides the "whole.jpg" file to the HTTP server 316 in response to the request from the HTTP server 316 in operation S450. The UI server 314 manages a communication between the UI application 312 and the HTTP server 316.

When the HTTP server 316 transmits the "whole.jpg" file to the browser module 332, the "whole.jpg" file is displayed on the screen of the browser corresponding to the UI by the browser module 332. The file may be displayed on the entire screen.

Figure 5:
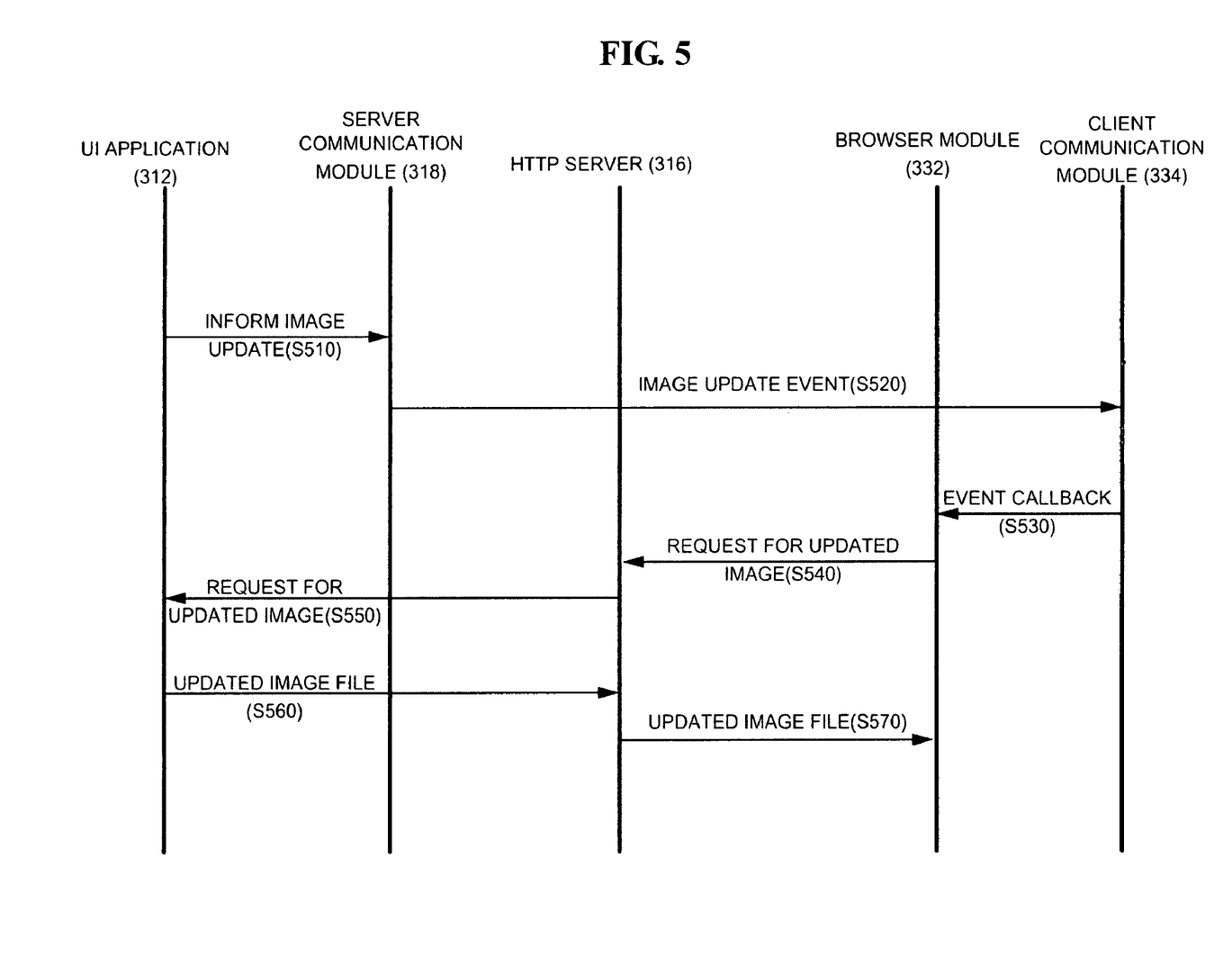
FIG. 5 is a flowchart illustrating a method of providing an updated image to a remote UI, according to an exemplary embodiment of the present invention.

FIG. 5 is a flowchart illustrating a method of providing an updated image to a remote UI, according to an exemplary embodiment of the present invention.

If the UP application 312 of the remote UI server 310 updates a portion of a screen that is currently provided to the user, the UI application 312 informs the server communication module 318 of an image update through the UI server 314 in operation S510. The UI application 312 also provides position information of the updated image to the server communication module 318. The position information may be X-Y coordinates, or other similar coordinate systems. For example, the UI application 312 may provide the coordinates of the top left corner of the updated image to the server communication module 318. However, any coordinate position which identifies the position of the updated image may be sent, e.g., a different corner of the updated image, or a center plus an offset, etc.

The server communication module 318 communicates with the client communication module 334 to provide image update event information and updated position information in operation S520.

The client communication module 334 receives a dynamically updated image and performs an operation to provide the updated image to the user. As an example of the operation, the client communication module 334 may call a callback function. For example, in operation S530, the client communication module 334 calls a javascript function registered as a callback in the initial page "index.html".

An example of the initial page "index.html" including the callback function is as follows. The callback function is a 'Comm_onDataArrival' function.

```
<HTML>
<HEAD>
<META HTTP-EQUIV="PRAGMA" CONTENT="NO-CACHE">
<OBJECT    ID="Comm"    classid="clsid:AAA-BBB-123-XXX" codebase="Comm.cab">
    <PARAM NAME=DeviceName VALUE="Dynamic UI Server">
    <EMBED    ID="Comm"    DeviceName="Dynamic    UI    Server" TYPE="application/Comm">
    </EMBED>
</OBJECT>
<SCRIPT LANGUAGE=JavaScript event=DataArrival for=Comm>   // register Event Callback
    <!--
    Comm_onDataArrival()
    -->
</SCRIPT>
<SCRIPT LANGUAGEe="JavaScript">
    <!--
    Comm.InitCommunication("192.168.0.3:9001");
    function Comm_onDataArrival()
    {
```

-continued

```
        var eventData;
        eventData = Comm.GetData();
        if (eventData.Type == 0x01) // if '0x01' is an event type of image update
        {
     updateImage(eventData.x,eventData.y); // x and y are coordinates of image.
        }
    }
    function updateImage(x,y)
    {
        var dd=document.createElement("div");
        updateArea.appendChild(dd);// create div area and overlap div area on
current page
        dd.innerHTML='<IMG src="update.jpg"
           style=position:absolute;left:   '      +X+';top:    '+y+'>';//    display
update.jpg
        count+=1;
        if(count>256)
        // if an image is repeatedly overlapped, resource shortage may occur.
        {
                Comm.CloseCommunication();
                document.reload(); // if more than a predetermined number of
images are piled on top of one another, receive the entire image.
        }
    }
    -->
    </SCRIPT>
    <BODY>
    <IMG src="whole.jpg"stype=position:absolute;left:0;top:0>// entire
screen image
        <DIV id="updateArea"DIV>
    </BODY>
    </HTML>
```

If the function "Comm_onDataArrival( )" is called by the client communication module 334, an event type and additional data (e.g., X and Y coordinates) are obtained from the function "Comm_onDataArrival( )". An updateImage( ) function is called to create an area on which images are to be overlapped through a dynamic HTML page.

The browser module 332 transmits a request for the updated image file ("update.jpg" file) to the HTTP server 316 in operation S540 and the HTTP server 316 transmits a request for the updated image file to the UI application 312 through the UI server 314 in operation S550.

The UI application 312 transmits the updated image file to the HTTP server 136 through the UI server 314 in operation S560 and the HTTP server 316 transmits the updated image file to the browser module 332 in operation S570.

The browser module 332 overlaps the updated image file ("update.jpg" file) over the created div area on the current HTML page at a position according to the X and Y coordinates. When too many images are overlapped, the entire page may be updated for initialization.

When another image update event occurs before the browser module 332 receives the updated image file after the remote UI server 310 generates an image update event in operation S520, the remote UI server 310 waits for the receipt of the current "update.jpg" file by the remote UI client 330 and then generates the next update event.

The remote UI server 310 may collect several image update events and transmit them as a single image update event for a large area at a time according to its determination.

Figure 6:
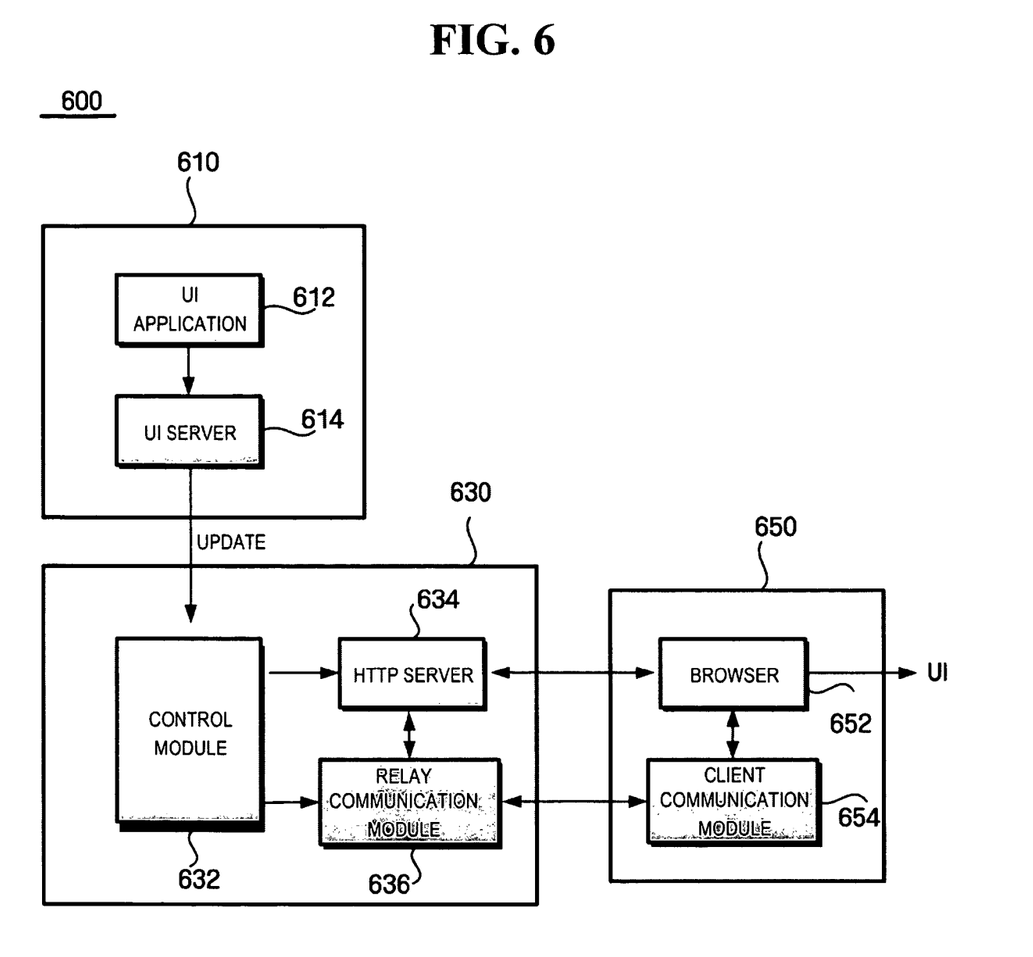
FIG. 6 illustrates a system for providing a remote UI, according to another exemplary embodiment of the present invention.

FIG. 6 illustrates a system for providing a remote UI, according to another exemplary embodiment of the present invention.

Referring to FIG. 6, a system 600 includes a remote UI server 610, a remote UI proxy server 630, and a remote UI client 650.

The remote UI server 610 includes a UI application 612 and a UI server 614 that correspond to the UI application 312 and the UI server 314 of FIG. 3, respectively. The remote UI server 610 has no HTTP server function and generates a dynamic UI, unlike the remote UI server 310 of FIG. 3.

The remote UI client 650 corresponds to the remote UI client 330 shown in FIG. 3 and provides a UI to the user through the browser 652.

The remote UI proxy server 630 relays position information between the remote UI server 610 and the remote UI client 650.

In other words, even if an image is updated by the UI application 612, the remote UI server 610 cannot directly transmit the updated image to the remote UI client 650, because the remote UI server 610 does not have an HTTP server function. Thus, the remote UI proxy server 630 receives the updated image from the remote UI server 610 and transmits the updated image to the remote UI client 650.

The remote UI proxy server 630 includes a control module 632, an HTTP server 634, and a relay communication module 636.

The control module 632 receives the updated image and position information of the updated image from the UI server 614 of the remote UI server 610 and transmits the received image and position information to the relay communication module 636.

The relay communication module 636 informs the client communication module 654 of an image update in the HTML file provided by the browser 652 and the client communication module 654 informs the browser 652 of the image update.

Once the browser 652 transmits a request for the updated image to the HTTP server 634, the HTTP server 634 transmits the updated image and position information of the updated image received by the relay communication module 636 to the browser 652.

The HTTP server 634 receives a remote UI created by the remote UI server 610 and the updated image and position information of updated image from the control module 632 and transmits the remote UI, the updated image, and the position information of the updated image to the remote UI client 650.

According to exemplary embodiments of the present invention, by providing a dynamic image in a web browser, the range of applications of an HTML-based UI display method can be enlarged.

Although the present invention has been described in connection with exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. A remote user interface (UI) server comprising:
   a UI application which is executed by at least one central processing unit (CPU) and provides a dynamic image;
   a server communication module which transmits, over a first communication channel, an image update event for an updated dynamic image, if the dynamic image is updated; and
   a hypertext transfer protocol (HTTP) server which is executed by at least one central processing unit (CPU) and receives a request in response to the transmitted image update event and transmits the updated dynamic image, over a second communication channel that is different from the first communication channel, in response to the received request.

2. The remote UI server of claim 1, wherein the server communication module transmits the image update event to a client, and the HTTP server receives the request from the client and transmits the updated dynamic image to the client.

3. The remote UI server of claim 2, wherein the server communication module transmits position information of the updated dynamic image to the client along with the image update event.

4. The remote UI server of claim 3, wherein the position information includes X-Y coordinates.

5. The remote UI server of claim 2, wherein the UI application generates a remote UI that includes the dynamic image, and the HTTP server transmits the remote UI to the client.

6. The remote UI server of claim 5, wherein the remote UI complies with a hypertext markup language format.

7. A remote user interface (UI) client comprising:
   a browser module which is executed by at least one central processing unit (CPU) and displays a remote UI; and
   a client communication module which receives, over a first communication channel, image update event information of an occurrence of an image update event in which an image in the remote UI is updated, and which informs the browser module of the occurrence of the image update event,
   wherein the browser module transmits a request for the updated image in response to the received image update event information, and receives the updated image, over a second communication channel that is different from the first communication channel, and displays the updated image on the remote UI.

8. The remote user interface (UI) client of claim 7, wherein the client communication module receives the image update event information from a server providing the remote UI, and the browser module transmits the request for the updated image to the server.

9. The remote UI client of claim 8, wherein the client communication module receives position information of the updated image from the server along with the image update event information and displays the updated image according to the position information.

10. The remote UI client of claim 9, wherein the position information includes X-Y coordinates.

11. The remote UI client of claim 8, wherein the remote UI complies with a hypertext markup language format.

12. A remote user interface (UI) proxy server comprising:
    a control module which is executed by at least one central processing unit (CPU) and receives an updated image of a remote UI;
    a relay communication module which transmits, over a first communication channel, to a client that displays the remote UI, image update event information of an occurrence of an image update event for the updated image; and
    a hypertext transfer protocol (HTTP) server which is executed by at least one central processing unit (CPU) and receives a request in response to the remote communication module transmitting the image update event information and transmits, over a second communication channel that is different from the first communication channel, the updated image to the client in response to the received request.

13. The remote user interface (UI) proxy server of claim 12, wherein the HTTP server receives the request from the client, and transmits the update image to the client in response to the received request.

14. The remote UI proxy server of claim 13, wherein the relay communication module transmits position information of the updated image to the client along with the image update event information.

15. The remote UI proxy server of claim 14, wherein the position information includes X-Y coordinates.

16. The remote UI proxy server of claim 13, wherein an UI application creates a remote UI that includes a dynamic image, and the HTTP server transmits the created remote UI to the client.

17. The remote UI proxy server of claim 16, wherein the remote UI complies with a hypertext markup language format.

18. A method for providing a remote user interface (UI), the method being executed by at least one central processing unit (CPU) and comprising:
    if an image in a remote UI is updated, transmitting, by the at least one processor, an image update event for the updated image over a first communication channel;
    receiving a request in response to the transmitted image update event; and
    transmitting the updated image, over a second communication channel that is different from the first communication channel, in response to the received request.

19. The method for providing a remote user interface (UI) of claim 18, wherein the image update event for the update image is transmitted to a client if the image in the remote UI is updated, and the updated image is transmitted to the client in response to a received request to display the updated image in the remote UI.

20. The method for providing a remote UI of claim 19, further comprising transmitting position information of the updated image to the client along with the image update event.

21. The method for providing a remote UI of claim 20, wherein the position information includes X-Y coordinates.

22. The method for providing a remote UI of claim 19, wherein the remote UI complies with a hypertext markup language format.

23. A method for providing a remote user interface (UI), the method being executed by at least one central processing unit (CPU) and comprising:
- displaying a remote UI;
- receiving, over a first communication channel, image update event information of an occurrence of an image update event in which an image in the remote UI is updated;
- transmitting, using at least one central processing unit (CPU), a request for the updated image in response to the received image update event information; and
- receiving, over a second communication channel that is different from the first communication channel, the updated image and displaying the updated image.

24. The method for providing a remote UI of claim 23, wherein a server providing the remote UI transmits the image update event information of the occurrence of the image update event, the request for the updated image is transmitted to the server in response to the received request, and the updated image is displayed in the remote UI.

25. The method for providing a remote UI of claim 24, wherein the remote UI complies with a hypertext markup language format.

26. The remote user interface (UI) server of claim 1, wherein the image update event is a flag indicating that the dynamic image has been updated.

* * * * *